United States Patent Office 3,756,982
Patented Sept. 4, 1973

3,756,982
ANTIFRICTION POLYMER MATERIALS AND
METHOD OF PRODUCING SAME
Vasily Vladimirovich Korshak, ulitsa Gubkina 4, kv. 81;
Irina Alexandrovna Gribova, ulitsa Vavilova 12, korpus
20, kv. 31; Alexandr Petrovich Krasnov, prospekt
Kalinina 31, kv. 28; Vladimir Alexandrovich Sergeev,
Profsojuznaya ulitsa 54, korpus 4, kv. 26; Valentin
Kuzmich Shitikov, Lomonosovsky prospekt 18, kv. 99;
and Georgy Vasilievich Elerdashvili, 1-y, Baltiisky
pereulok 6/21, korpus 7, obschezhitie, all of Moscow,
U.S.S.R.
No Drawing. Filed Aug. 28, 1970, Ser. No. 68,008
Claims priority, application U.S.S.R., Oct. 23, 1969,
1376328
Int. Cl. C08f 45/04
U.S. Cl. 260—41 R                           3 Claims

ABSTRACT OF THE DISCLOSURE

A method of producing heat-resistant up to 350° C. antifriction materials for dry friction units. The method consists in curing a mixture of polyphenylene oligomers in combination with various fillers. The oligomers are characterized by the structure

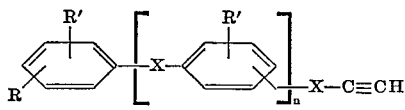

wherein
X is a direct band, phenylene,

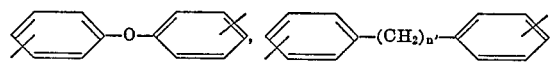

$n'=0-8$;
R is H, phenyl,

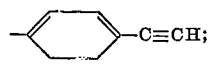

R' is H, phenyl,

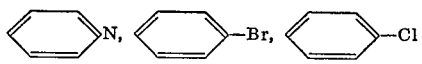

and also —X—CH≡CH;
$n=0-600$, wherein when X is a direct bond, $n$ is at least 1.

The cured products feature a friction coefficient of 0.08–0.17, heat resistance up to 370° C., impact strength up to 17 kg.-cm./cm.$^2$, and can be used, mainly for rolling and sliding friction units.

---

The present invention relates to antifriction materials, and more particularly to polymer antifriction materials which are used to operate under dry friction conditions, and to a method of producing such materials.

Known in the art is a number of antifriction polymer materials that are used for operation under dry friction conditions. Such materials are produced, mainly, on the basis of polytetrafluoroethylene and fillers, including antifriction fillers, such as molybdenum disulphide and graphite. Such a material is proposed, for example, in U.S. Pat. No. 3,453,208.

However, the material disclosed in said U.S. patent and other similar materials suffer from a number of disadvantages, the most essential of these being:

(1) Insufficient thermostability of polytetrafluoroethylene, which may lead to evolution of toxic substances from the zone of friction.

(2) Low heat resistance, not exceeding 220° C., which practically precludes the possibility of using such material at higher temperatures.

(3) High absolute value of friction coefficient, which is as great as 0.2 for pure polytetrafluoroethylene under conditions of friction between end surfaces.

(4) Difficulties encountered when producing composite materials on the basis of polytetrafluoroethylene, that are associated with a complicated technology of preparing monolithic samples.

(5) Instability of such materials under conditions of radiation and high vacuum.

The advantages offered by the polyphenylene structure over any other structure of an organic polymer as regards its thermostability and heat resistance are well known from literature sources.

However, the obtained polymers of polyphenylene type feature a high molecular weight and a rigid structure and, due to their poor flowability and insolubility, cannot be used for producing composite materials.

The object of the present invention is to provide an antifriction material which can operate without liquid lubrication up to a temperature of 350° C.

Said object is accomplished by using for the preparation of a composite polymer material (an antifriction material being implied), a mixture of oligomers of the polyphenylene type, that contain ethynyl groups, have a low molecular weight and, as a consequence, feature fusibility and solubility. We have established, that such a mixture of oligomer products, in the presence of fillers selected by us, under the conditions specified hereinbelow, can, under the effect of elevated temperatures, become cured, resulting in the formation of heat-resistant materials.

Thus, the material proposed herein is a product of curing of a composition consisting of a mixture of oligomers of polyphenylene, whose molecular weight is low, which are fusible, either partially or completely soluble in organic solvents, contain ethynyl groups, and conform to the approximate structural formula

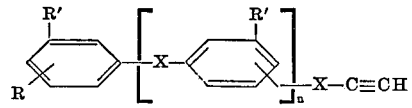

wherein
X is a direct band, phenylene,

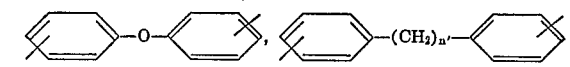

$n'=0-8$;
R is H, phenyl,

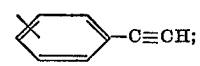

R' is H, phenyl,

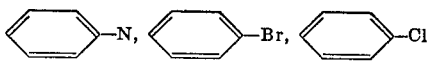

and also —X—CH≡CH;
$n=0-600$, wherein when X is a direct bond, $n$ is at least 1, and of fillers, of which at least one possesses antifriction properties. A mixture of oligomers of polyphenylene featuring the specified properties can be obtained in the following fashion by the reaction of polycyclotrimerization of di- and monoethynyl compounds, the formula of the diethynyl derivative being $$HC≡C—X—C≡CH$$

wherein X is

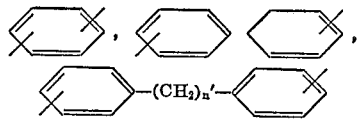

$n = 0-8$

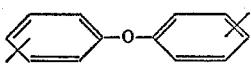

and the formula of the monoethynyl derivative being $$R—C≡CH$$

wherein R is phenyl,

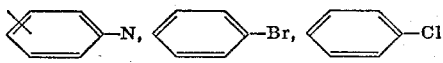

The ratio between mono- and diethynyl products may be varied within a wide range (from 5:1 to 1:1) for attaining the desired effect.

The reaction of polycyclotrimerization proceeds in a solution of organic solvents (toluene, ethanol, dioxane) at a temperature of 70-80° C. in the presence of catalysts, which are complex compounds of transition metals, such as $[(C_2H_5O)_3P]_4CoBr$, during 2-10 hours.

In the course of the reaction there takes place the closure of the benzene ring from 3 ethynyl groups in the 1,3,5 or in the 1,2,4 position,

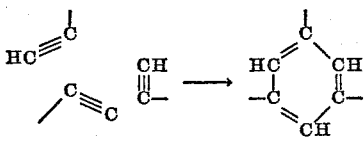

which is present in the obtained mixture of oligomers.

The obtained mixture of oligomers is noted for the presence of fractions having different molecular weight, ranging from 300 to 10,000, as determined ebullioscopically in a solution of chloroform.

The melting point of the product is within the range of 50 to 140° C. The mixture of oligomers contains unreacted free ethynyl groups.

As fillers, the material of the present invention comprises substances that are either produced synthetically, or have a natural mineral origin, at least one of these substances possessing antifriction properties.

In the present case the question is of a group of the so-called "solid lubricants" and similar substances, the main representatives of which, that have been tested for the production of the material proposed by us are: molybdenum disulphide, graphite, boron nitride, tungsten disulphide, tungsten diselenide, graphitized fibre, talc, vermiculite.

Besides the above-cited group of fillers, the present material may aslo comprise a filler, selected from the group consisting of strengthening agents: glass fibre, asbestos fibre, carbon fibre; from the group consisting of metallic fillers: powdered copper, nickel, silver, molybdenum; and also from the group consisting of additives able to regulate friction: silica dust, asbestos powder.

The proposed fillers do not interfere with the curing of the mixture of polyphenylene oligomers.

The present antifriction material proves to be operable at temperatures up to 300-350° C., and thus excels the known antifriction materials used in dry friction units.

The most interesting and cheap variety of the present material, which at the same time exhibits excellent thermophysical properties, is an antifriction material which is a product of curing of a composition, consisting of a mixture of polyphenylene oligomers conforming to the structure

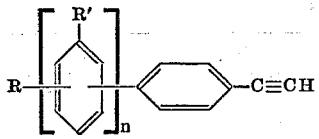

wherein

R' is phenyl; R is H, phenyl,

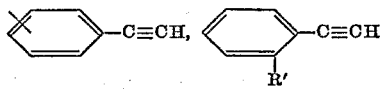

$n = 1-600$ and fillers, at least one of which has antifriction properties. In this case a mixture of polyphenylene oligomers comprises oligomers obtained by the reaction of polycyclotrimerization from phenylacetylene and diethynyl-benzene, taken in a molar ratio of 3:1.

The molecular weight of the polyphenylene mixture thus obtained, as determined ebullioscopically in a solution of chloroform, is 1000-7000. The melting point is 60° C.

As fillers the proposed material comprises a number of substances, the use of which will become more fully appreciated from a consideration of the following table, which lists only the fillers employed, without specifying the mixture of oligomers.

TABLE 1

| Groups of fillers | Fillers |
| --- | --- |
| Antifriction fillers | Molybdenum disulphide. Graphite. Boron nitride. Tungsten disulphide. Tungsten diselenide. Graphitized fibre. Talc. Vermiculite. |
| Strengthening fillers | Glass fibre. Carbon fibre. Asbestos fibre. |
| Metallic fillers | Copper powder. Nickel powder. Silver powder. Molybdenum powder. |
| Friction-regulating additives. | Silica dust. Asbestos powder. |

Articles manufactured from the material thus produced feature excellent heat resistance, reaching 350° C.

However, due to an excessively rigid structure of the resulting cured product, in many cases it is expedient to use fibre or a fabric filler. In all cases an appropriate combination is recommendable, as shown in the table and substantiated by examples.

Another variety featuring improved physico-mechanical properties is a material which is a product of curing of a composition, consisting of a mixture of polyphenylene oligomers conforming to the formula

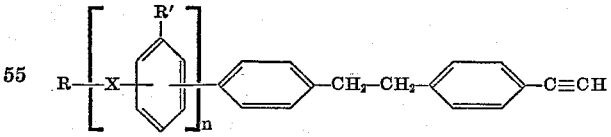

wherein
R is H, —C≡CH;
$n = 1-600$;
X is a direct bond

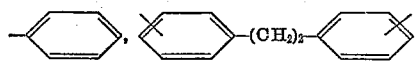

R' is H,

and fillers, of which at least one has antifriction properties.

In this case the mixture consists of polyphenylene oligomers produced by the reaction of polycyclotrimerization from phenylacetylene and diethylnyldiphenylethane.

The molecular weight of the obtained mixture of oligomers is about 5000. The melting point is about 70° C. As fillers the present material comprises a number of substances, whose use will become more fully apparent from a consideration of Table 2 below.

TABLE 2

| Groups of fillers | Fillers |
|---|---|
| Antifriction fillers | Molybdenum disulphide. Graphite. Boron nitride. Tungsten disulphide. Tungsten diselenide. Graphitized fibre. Talc. Vermiculite. |
| Strengthening fillers | Glass fibre. Carbon fibre. Asbestos fibre. |
| Metallic fillers | Copper powder. Nickel powder. Silver powder. Molybdenum powder. |
| Friction-regulating additives. | Silica dust. Asbestos powder. |

Articles manufactured from this material exhibit improved physico-mechanical characteristics, even in case strengthening fibrous filler is absent in some materials.

For producing the antifraction materials proposed herein, it is necessary to realize several stages of the technological process.

As a result of the synthesis, the oligomer compounds of polyphenylene feature considerable polydispersity in their molecular weight and may be said to approximately conform to the following structural formula:

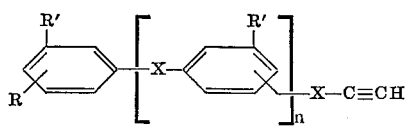

wherein

X is a direct bond phenyl;

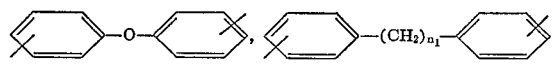

$n_1 = 0-8$

R is phenyl, H,

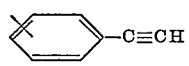

R' is phenyl,

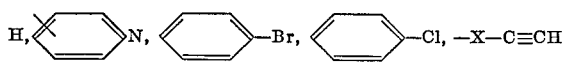

$n = 0-600$, while X and $n$ cannot be simultaneously equal to zero.

For producing antifriction materials with optimal properties, the mixture of oligomers is to be subjected to heating either under a vacuum or in air at a temperature of 80–150° C.

The duration of heating is determined by the melting point of the final product. The initial melting point of the mixture of polyphenylene oligomers is 50–120° C. The operation of preheating carried out at a temperature of 80–150° C. ensures the obtaining of a product with a melting point of 140–230° C.

An important operation is that of blending the mixture of oligomers with fillers, which should be performed in such a manner as to ensure good homogenation of the composition and its dispersity of not over 0.1 mm. One of the ways to realize such a process is to combine the mixture of oligomers of polyphenylene with a filler in vibration mills having a high frequency and an amplitude up to 5 mm. In this case the blending is reasonable to be carried out in several steps, each lasting for some minutes, so that the mass being blended should not be become heated to such temperatures, at which its fusion is liable to occur.

A large variety of substances may be used as fillers, such as would improve the properties of the antifriction material, namely, its wear resistance, low coefficient of friction, heat conductivity, impact resistance, hardness, running-in, stability of friction coefficient at high and low temperatures, and workability.

For these requirements to be adequately met, the substances being introduced may be taken in various quantitative ratios, so as to ensure the operability of the material under particular conditions. Diversity and, quite often, even contradictory character of the requirements to be met, for example, by rolling and sliding bearing units, result in that the content of different fillers in the material may vary within a wide range, as can be seen from the following table:

TABLE 3

| Groups of fillers | Fillers | Amount of filler [1] |
|---|---|---|
| Antifriction fillers | Molybdenum disulphide | 10–95 |
| | Graphite | 10–82 |
| | Boron nitride | 6–56 |
| | Tungsten disulphide | 10–95 |
| | Tungsten diselenide | 3–95 |
| | Graphitized fibre (staple) | 10–75 |
| | Talc | 4–25 |
| | Vermiculite | 4–20 |
| Metallic fillers | Copper powder | 6–30 |
| | Nickel powder | 6–30 |
| | Silver powder | 6–30 |
| | Molybdenum powder | 6–30 |
| Friction-regulating additive. | Silica dust | 0.5–6 |
| | Asbestos powder | 0.5–7 |
| Polymer binder | Mixture of polyphenylene oligomers. | 5–90 |

[1] In composition (in weight percent).

The fillers can be subdivided into several groups, depending on the effect they realize in the resulting material.

After the operation of blending a pulverulent mass is obtained, into which fibres of graphitized fabric may also be incorporated.

The resulting moulding composition is processed on conventional equipment employed at plants for processing plastic materials. The temperature of processing may be selected to lie within 130–450° C., but preferably within 280–370° C.

The pressure is selected in such a way as to ensure the obtaining of an adequately shaped monolithic article, and may be within a range of 80 to 1000 kg. per sq. cm., though the pressure ranging from 300 to 600 kg. per sq. cm. is preferable.

The time of moulding at said temperature is from 1 to 5 min. per mm. of the article thickness.

In accordance with the present method articles may be produced, which can be successfully used in units, subject to rolling or sliding friction, and be made as bushings, shells and cages of ball bearings. The articles thus produced may have either small dimensions, of 3 mm. in diameter, or with a diameter exceeding 50 mm. If required, the articles may be armoured.

The field of application of said articles is, first of all, such friction units which operate at high temperature reaching 350° C., or under other conditions where liquid and consistent lubricants cannot be employed.

Examples of such conditions are high vacuum, low temperatures, and atomic irradiation.

The present invention can also be realized in a different way.

Such other embodiment of the present invention consists in that said initial mixture of polyphenylene oligomers, which features the above-specified structure and a melting point of 50–140° C., is dissolved in ethanol (toluene, benzene, or dioxane being also applicable as solvents), in an amount sufficient for obtaining a 20–50 percent solution. Pulverulent fillers are introduced into the solution, selected from the following groups and taken in the following amounts (in weight percent):

antifriction fillers: molybdenum disulphide, 5–45; graphite, 5–82; boron nitride, 3–56; tungsten disulphide, 10–95; tungsten diselenide, 3–95; talc, 4–25; metallic fillers: copper powder, 4–30; nickel powder, 4–30; silver powder, 4–30; molybdenum powder, 4–30; friction-regulating additives: silica dust, 0.5–6; asbestos powder, 0.5–7.

The solution is then stirred till a homogeneous mass is obtained.

The resulting suspension is used to impregnate a fibrous filler or fabric, respectively: graphitized fabric or fibre in an amount of 10–50 percent, glass fabric or fibre in an amount of 7–25 percent, carbon fabric or fibre in an amount of 7–40 percent, asbestos fabric or fibre in an amount of 3–40 percent.

It is also possible to impregnate graphitized or carbon fabric with the solution of the mixture of oligmers without introducing a pulverulent filler thereinto.

After the impregnation, the fabric or mass is dried under a vacuum or in air at a temperature of 80–150° C., till the melting point of the mixture of oligomers becomes 100–230° C.

The resulting impregnated mass or fabric is a product fit for processing. The processing is carried out on conventional equipment used at plants producing plastic materials, in compression moulds at temperatures ranging from 130 to 450° C., preferably from 280 to 370° C., under a pressure ensuring the obtaining of an adequately shaped article. The pressure is selected to be within a range from 7 to 1000 kg. per sq. cm., preferably from 25 to 700 kg. per sq. cm.

The time of moulding at the above-specified temperature is from 1 to 30 min. per mm. of the article thickness.

In accordance with the present method antifriction articles can be produced, which are noted for such specific features as high heat resistance and impact strength, so that such articles may be used to operate in the most demanding rolling and sliding friction units.

The present method makes it possible to manufacture component parts in the form of bushings, workpieces, rings, etc., which do not require subsequent finishing of their inside and outside diameters. If necessary, the articles may be treated on conventional metal working machines.

The field of application of the materials produced in compliance with our method comprises friction units, in which liquid or consistent lubricants cannot be used; these are such units which operate under conditions of high temperatures (+350° C.), low temperatures (–200° C.), exposed to irradiation, and subject to intensive vibrations.

For a better understanding of the present invention, given hereinbelow are examples, illustrating the realization of the proposed method of producing antifriction materials and the properties of the latter.

EXAMPLE 1

(A) A mixture of polyphenylene oligomers, obtained by the reaction of polycyclotrimerization which is described below in Item B, is a dark-coloured mass with a melting point of –50° C.

For producing an antifriction material, the mass is dried in a vacuum drier at a temperature of 120–130° C., till the melting point of the mixture of oligomers becomes as high as 200° C. The thus dried vitreous mass is ground down to particle size less than 0.5 mm., and then mixed with pulverulent fillers.

The operation of mixing or blending is performed on a vibration mill having an amplitude of oscillations of 5 mm. and a frequency of 3000 oscillations per min.

The blending is carried out in cycles of 1 min. duration. The total time of blending is 3–5 min.

The quantities of the components being blended are given in the table hereinbelow.

TABLE 4

| Component groups of material | Polymer and fillers | Possible amount of filler in material (percent) | Material No. 1 (wt. percent) | Material No. 2 (wt. percent) | Material No. 3 (wt. percent) |
|---|---|---|---|---|---|
| Polymer binder | Mixture of polyphenylene oligomers | 5–90 | 15 | 30 | 25 |
| Antifriction fillers | Molybdenum disulphide | 10–95 | 20 | 35 | 25 |
|  | Graphite | 5–82 | 40 |  | 20 |
|  | Boron nitride | 3–56 |  |  | 5 |
|  | Tungsten disulphide | 10–95 |  |  |  |
|  | Tungsten diselenide | 3–95 |  |  |  |
|  | Graphitized fibre | 10–75 |  |  |  |
|  | Talc | 4–25 |  |  |  |
|  | Vermiculite | 4–20 |  | 5 |  |
| Strengthening fillers | Glass fibre | 7–25 |  | 10 |  |
|  | Carbon fibre | 7–40 |  | 10 |  |
|  | Asbestos fibre | 3–40 |  |  |  |
| Metallic filler | Copper powder | 4–30 |  |  |  |
|  | Nickel powder | 4–30 | 10 |  |  |
|  | Silver powder | 4–30 | 15 | 10 | 20 |
|  | Molybdenum powder | 4–30 |  |  |  |
| Friction regulating additives | Silica dust | 0.5–7 |  |  |  |
|  | Asbestos powder | 0.5–7 |  |  | 5 |

The resulting moulding compound is a loose dark-coloured mass.

For producing articles, the moulding compound is poured into cold compression moulds of a closed type, and heated to a temperature of 180° C., at which temperature the compression mould is closed and a pressure of 400–700 kg. per sq. cm. is built up therein.

Then the temperature is raised to 350° C., the moulding compound is kept under these conditions over a period of 0.5 min. per mm. of the article thickness, and then the mould is cooled.

The article thus produced has a heat resistance up to 320–350° C., friction coefficient of 0.08–0.16, and a high wear resistance up to a temperature of 300° C.

The articles may be successfully used as bushings for sliding bearings and cages for rolling bearings. It is possible to produce armoured articles and workpieces, from which, after treating on metal working machines, articles will be made finished to size.

A modification of the present example is a method when fibrous fillers are introduced into the composition of the material.

According to this last-mentioned method, into the resulting moulding compound which is a dark-colored powder, a fibre is introduced in the form of staple, in a Z-shaped type mixer.

The composition thus obtained is charged into compression moulds and then processed by following the above-described procedure.

(B) Method of producing the mixture of polyphenylene oligomers used in Example 1 and in Table 4.

A three-necked flask equipped with a stirrer and a reflux condenser is charged with 12.6 g. (0.1 mole) of diethynylbenzene, 30.6 g. (0.3 mole) of phenylacetylene, 1.6 g. (0.002 mole) cobaltic trialkylphosphate complex [(C$_2$H$_5$O)$_3$P]$_4$CoBr, and a mixture of 75 ml. of dioxane and 25 ml. of absolute alcohol. The reaction is carried out in a stream of nitrogen at a temperature of 75–78° C. during 4 hours. The colour of the reaction mass changes from bright yellow to dark brown. At the end of the reaction a small amount of a precipitate may be observed. Then the solvent is distilled off from the reaction mass, and the reaction mass is washed, successively, with water, hydrochloric acid, boiling hydrochloric acid, water, a 0.5 N solution of alkali, and with water. The molecular weight of the resulting mixture of polyphenylene oligomers, as determined ebullioscopically in a solution of chloroform, is 1000–7000. The melting point is 50–80° C.

By following the same method, and under similar conditions, a mixture of polyphenylene oligomers can be prepared from: phenylacetylene (3 moles) and diethynyldiphenylethane (1 mole); phenylacetylene (2 moles) and diethynylbenzene (1 mole); diethynylbenzene (1 mole) and chlorophenylacetylene (1 mole); phenylacetylene (2 moles) and diethynyldiphenylbutane (1 mole).

The obtained oligomers of polyphenylene may be used for producing antifriction materials as described in Example 1.

EXAMPLE 2

Mixtures of polyphenylene oligomers, whose preparation is set forth in Example 1, are used for producing antifriction materials by following the impregnation techniques.

For this purpose a solution of a mixture of oligomers in an alcohol is prepared at a temperature of up to 60° C.

Pulverulent fillers may be added into the solution, till a homogeneous suspension is obtained, with which a fibrous filler or fabric is then impregnated. However, a fibrous filler, in case it possesses antifriction properties, may be impregnated directly with a solution of polyphenylene, without introducing a pulverulent filler thereinto.

The amounts of a pulverulent filler to be introduced and possible ratios between the components of the material will be best understood by considering the following table.

is built up therein with a view towards obtaining an article of adjustable density. The temperature is raised up to 350° C., at which the article is kept over a period of 3 min. per mm. of the article thickness, whereupon the article is cooled.

The resulting articles are workpieces which can be finished to a required size on metal working machines. The articles are intended to be used in friction units which operate without lubrication, and feature friction coefficient of 0.1–0.18 and heat resistance up to 370° C.

In the above-cited examples preferable compositions of compound materials have been specified. It should be clear, however, that modifications and changes may be resorted to, without departing from the spirit and scope of the present invention, as those skilled in the art will easily understand.

What is claimed is:

1. An antifriction polymer material which is a product of curing of a composition consisting of a mixture of polyphenylene oligomers, containing ethynyl groups and conforming to the following approximate structural formula:

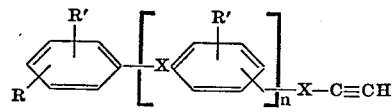

wherein

X is a direct bond, phenylene,

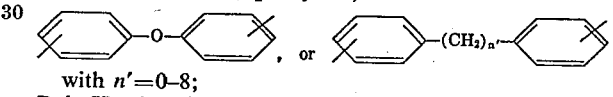

with $n'=0-8$;

R is H, phenyl,

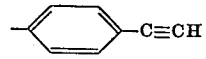

R' is H, phenyl,

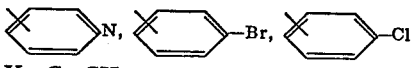

or —X—C≡CH;

$n=2-600$;

and fillers, of which at least one possesses antifriction properties.

2. An antifraction material as claimed in claim 1, which is a product of curing of a composition, consisting of a

TABLE 5

| Groups of fillers | Fillers | Possible percentage of filler in composition | Material No. 1 (percent) | Material No. 2 (percent) | Material No. 3 (percent) |
|---|---|---|---|---|---|
| Antifriction fillers | Molybdenum disulphide | 10–95 | | | |
| | Graphite | 5–82 | | 10 | 10 |
| | Boron nitride | 3–56 | | | |
| | Tungsten disulphide | 10–95 | | | 7 |
| | Tungsten diselenide | 3–95 | | | |
| | Graphitized fibre (staple) | 10–90 | 70–40 | 30 | 20 |
| | Graphitized fabric | | | | |
| | Talc | 4–25 | | | |
| Metallic fillers | Copper powder | 4–30 | | | |
| | Nickel powder | 4–30 | | | 5 |
| | Silver powder | 4–30 | | 5 | |
| | Molybdenum powder | 4–30 | | | 10 |
| Friction-regulating additives | Silica dust | 0.5–6 | | | |
| | Asbestos powder | 0.5–7 | | | 3 |
| | Mixture of polyphenylene oligomers | 5–90 | 30–60 | 30 | 30 |
| Strengthening fillers | Glass fibre (glass fabric) | 7–25 | | | |
| | Carbon fibre (carbon fabric) | 7–40 | | | 15 |
| | Asbestos fibre (asbestos fabric) | 3–40 | | | |

The result of the impregnation procedure is an impregnated mass or fabric which is then dried at a temperature of 130° C. over a period of time required for the melting point of the mixture of oligomers to become 180° C.

The mass thus obtained is placed into cold compression moulds, heated up to 180° C., the compression mould is then closed, and a pressure of 8–500 kg. per sq. cm.

mixture of polyphenylene oligomers containing ethynyl groups conforming to the formula

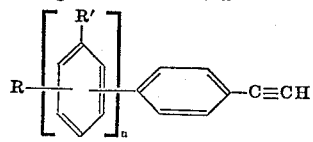

wherein

R′ is phenyl,
R is H, phenyl,

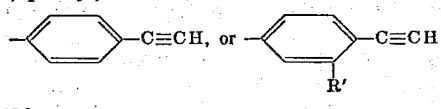

$n = 1-600$ and fillers, selected from the group consisting of graphite, graphitized fibre, sulphides, selenides of metals, talc, vermiculite, boron nitride; from the group of strengthening fillers: glass fibre, asbestos fibre, carbon fibre; from the group of metallic fillers: powders of copper, nickel, silver, molybdenum; from a group of friction-regulating additives: silica dust and asbestos powder.

3. An antifriction material as claimed in claim 1, which is a product of curing of composition consisting of a mixture of polyphenylene oligomers containing ethynyl groups conforming to the formula

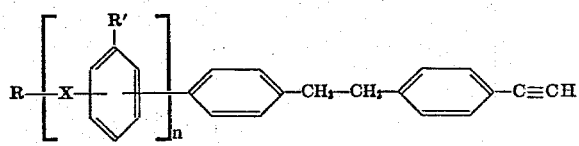

wherein

R is H, or —C≡CH,
R′ is H, phenyl, or

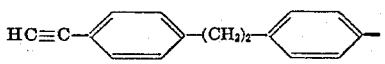

X is a direct bond,

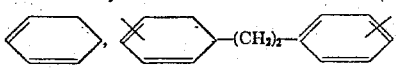

$n = 1-600$, and fillers, selected from the group consisting of graphite, graphitized fibre, sulphides, selenides of metals, talc, vermiculite, boron nitride; from the group of strengthening fillers: glass-fibre, asbestos fibre, carbon fibre; from the group of metallic fillers; powders of copper, nickel, silver, molybdenum; from the group of friction-regulating additives: silica dust and asbestos powder.

References Cited
UNITED STATES PATENTS

| | | | |
|---|---|---|---|
| 2,751,628 | 6/1956 | Carpenter | 260—94.1 |
| 3,092,613 | 6/1963 | Kennerly | 260—94.1 |
| 3,438,957 | 4/1969 | Hsieh | 260—94.1 |
| 3,051,693 | 8/1962 | Leto | 260—94.1 |

MORRIS LIEBMAN, Primary Examiner

P. R. MICHL, Assistant Examiner

U.S. Cl. X.R.

260—47 UA, 91.1 M, 93.5 C, 612 R, 613 R, 649 R, 668 R, 678